(12) United States Patent
Pelisser

(10) Patent No.: US 6,216,358 B1
(45) Date of Patent: Apr. 17, 2001

(54) GAS-QUENCHING CELL

(75) Inventor: Laurent Pelisser, Saint Jean de Moirans (FR)

(73) Assignee: Etudes et Constructions Mecaniques, Cedex (FR)

( * ) Notice: Subject to any disclaimer, the term of this patent is extended or adjusted under 35 U.S.C. 154(b) by 0 days.

(21) Appl. No.: 09/322,658

(22) Filed: May 28, 1999

(30) Foreign Application Priority Data

May 29, 1998 (FR) .................................................. 98 06971

(51) Int. Cl.$^7$ ...................................................... F26B 19/00
(52) U.S. Cl. .................................. 34/62; 34/84; 266/249; 266/250
(58) Field of Search .............................. 34/179, 181–185, 34/187, 62, 63, 83, 84; 432/135, 173, 198, 151; 165/159, 160, 109.1, 108, 104.34; 266/249, 250, 251, 259

(56) References Cited

U.S. PATENT DOCUMENTS

| | | | | |
|---|---|---|---|---|
| 3,614,074 | * | 10/1971 | Wellford, Jr. ........................ | 263/40 R |
| 4,086,050 | * | 4/1978 | Luiten et al. ............................ | 432/25 |
| 4,219,325 | * | 8/1980 | Gutzwiller ............................ | 432/199 |
| 4,278,421 | * | 7/1981 | Limque et al. ......................... | 432/152 |
| 4,352,675 | * | 10/1982 | Seipenbusch et al. ................... | 48/73 |
| 4,462,577 | * | 7/1984 | Westeren ............................... | 266/250 |
| 4,610,435 | * | 9/1986 | Pfau et al. ............................. | 266/250 |
| 4,736,527 | * | 4/1988 | Iwamoto et al. ....................... | 34/57 E |
| 4,867,808 | * | 9/1989 | Heilmann et al. ..................... | 148/20.3 |
| 4,963,091 | * | 10/1990 | Hoetzl et al. ......................... | 432/176 |
| 5,018,968 | * | 5/1991 | Barreto ................................. | 432/116 |
| 5,052,923 | * | 10/1991 | Peter et al. ............................ | 432/205 |
| 5,094,013 | * | 3/1992 | Martin et al. ............................ | 34/62 |
| 5,227,018 | * | 7/1993 | Bro et al. ............................. | 159/4.02 |
| 5,478,985 | * | 12/1995 | Hoetzl et al. ......................... | 219/400 |
| 5,550,858 | * | 8/1996 | Hoetzl et al. ......................... | 373/110 |
| 5,630,469 | * | 5/1997 | Butterbaugh et al. ............... | 165/80.3 |

FOREIGN PATENT DOCUMENTS

| | | |
|---|---|---|
| 2501360 | 7/1976 | (DE) . |
| 4403275 | 8/1994 | (DE) . |
| 0313888 | 5/1988 | (EP) . |
| 0541046 | 3/1992 | (EP) . |
| 0641923 | 1/1993 | (EP) . |

OTHER PUBLICATIONS

La Vitesse de Refroidissement, Point Capital Pour Le Traitement Thermique en Fours Sous Vide, by J. Naudot, p. 31–35, vol. 133, No. 3, 1979, XP002093519.

* cited by examiner

*Primary Examiner*—Pamela Wilson
(74) *Attorney, Agent, or Firm*—Arthur L. Plevy; Buchanan Ingersoll PC

(57) ABSTRACT

A cell for gas-quenching a load is provided, including guiding plates and a stirring element driven by an engine to cause a gas flow between the load and an exchanger. The stirring element is an adjustable pitch blade propeller.

20 Claims, 3 Drawing Sheets

GAS-QUENCHING CELL

BACKGROUND OF THE INVENTION

1. Field of the Invention

The present invention relates to a gas-quenching cell, and more specifically, to the gas stirring system for such a cell.

2. Discussion of the Related Art

Gas-quenching methods have many advantages as compared to liquid-quenching methods, especially the fact that the processed elements remain dry and clean.

The paper entitled "La vitesse de refroidissement, point capital pour le traitement en fours sous vide" by J. Naudot, published in "Traitement thermique" N°133–79, France, discusses the influence of several parameters and of the gas choice on the efficiency of the quenching, mainly on the quenching speed. It is constant that if the quenching speed is to be increased, the gas mass flow, that is, its speed and its static pressure should be increased. The above-mentioned paper mentions that beyond 4 to 5 bars of static nitrogen pressure, the efficiency gain is to be tempered by the cost of the high power engines necessary for the stirring and the high gas consumption.

European patent 0,313,888 discloses using light gases, such as helium or hydrogen, at high static pressures. The power of the stirring engines would then be comparable to that reached for heavier gases at lower pressures. However, light gases are particularly expensive (helium) or dangerous (hydrogen).

The quenching efficiency, such as defined in the above documents, is relative to the quenching speed.

Gas-quenching installations are presently used only for quenching operations, since they are generally optimized to obtain as high a gas mass flow as possible.

Summary of the invention

An object of the present invention is to provide a gas-quenching cell offering a widened range of possibilities.

Another object of the present invention is to provide such a quenching cell offering optimum performance over a wide range of gas mass flows.

To achieve these objects, the present invention provides a cell for gas-quenching a load, including guiding plates and a stirring element driven by an engine to cause a gas flow between the load and an exchanger. The stirring element is an adjustable pitch blade propeller.

According to an embodiment of the present invention, the pitch of the blade propeller is adjusted so that, at a desired gas mass flow, the engine operates with a maximum efficiency of power transmission to the flow.

According to an embodiment of the present invention, the cell is cylindrical or parallelepiped-shaped and the exchanger is arranged axially on either side of the load, the axis of the blade propeller being perpendicular to the plane of the exchanger.

According to an embodiment of the present invention, the cell is separate from a furnace used to heat up the load before cooling.

According to an embodiment of the present invention, the cell includes a duct forming a loop external to the cell, through which is forced the gas flow.

According to an embodiment of the present invention, the exchanger is arranged in the duct.

According to an embodiment of the present invention, the blade propeller is arranged in the duct.

According to an embodiment of the present invention, the exchanger is in the form of a disk arranged so that it is run through by opposite gas flows at its periphery and at its center.

According to an embodiment of the present invention, the exchanger is arranged as a crown around the blade propeller axis.

According to an embodiment of the present invention, the gas is nitrogen or a mixture including at least 50% of nitrogen, at a pressure between 1 and 50 bars.

According to an embodiment of the present invention, the cell includes several stirring blade propellers.

The foregoing objects, features and advantages of the present invention will be discussed in detail in the following non-limiting description of specific embodiments in connection with the accompanying drawings.

DETAILED DESCRIPTION

The present invention provides using a same gas-quenching cell to perform a wide range of processing with all sorts of gases, including so-called "controlled cooling" operations by using a majority proportion of nitrogen, which is the most commonly used gas.

Such a cell thus performs a brutal quenching with high gas mass flows as well as a controlled or slow cooling with very low mass flows.

For this purpose, gas mass flows variable in large proportions should be available and the power taken from the stirring engine should be limited when the characteristics of the gas and the chosen speed/pressure parameters would result in an excessive power consumption.

Figure 1A:
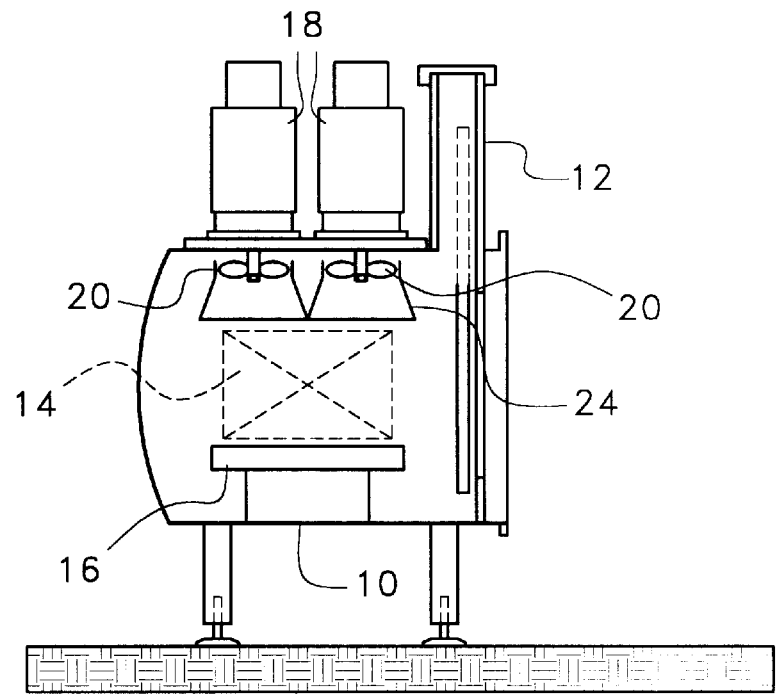
FIGS. 1A and 1B show two views of a first embodiment of a gas-quenching cell.
Figure 1B:
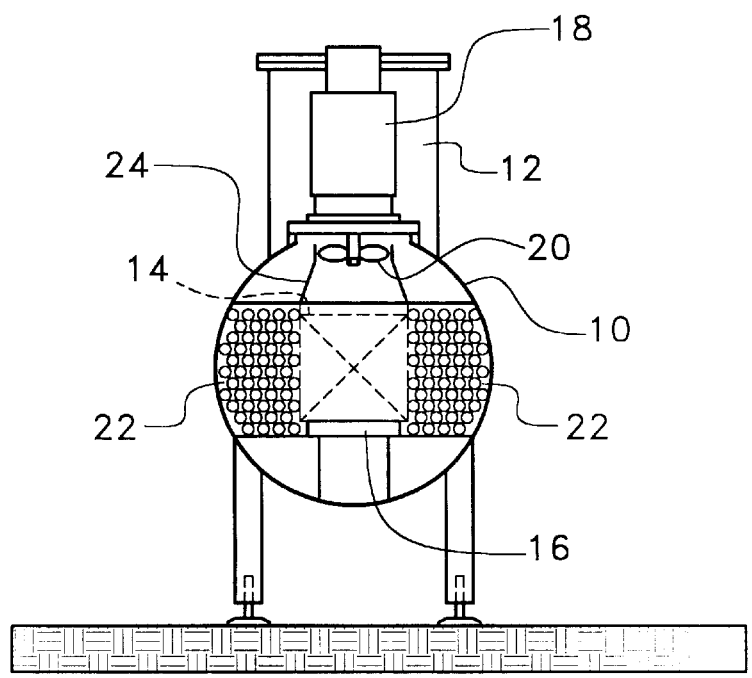

FIGS. 1A and 1B schematically show a lateral cross-section view and a front cross-section view of a gas-quenching cell which may be used according to the present invention. The cell includes an enclosure 10 of generally cylindrical or parallelepipedic shape with a horizontal axis. The cell is closed at one end while the other end comprises a sliding trap 12 providing access to the cell to introduce therein or extract therefrom a load to be processed 14. Of course, trap 12 enables air-tight closing of the quenching cell. Load 14 is maintained substantially at the center of the cell on a plate 16.

The upper portion of the cell is provided with two external engines 18 of vertical axis, arranged one next to the other in the longitudinal direction of the cell. The engines drive respective stirring elements 20 inside the cell.

As can be seen from FIG. 1B, the cell is provided with an exchanger 22 arranged on either side of load 14 in a horizontal plane. Between exchanger 22 and load 14 are arranged guiding plates 24 which join the stirring devices 20 to direct the gas flow generated by the latter between load 14 and exchanger 22. With this configuration, the quenching gas flows, for example, by going down through load 14 and by rising back up through exchanger 22.

Conventionally, the stirring elements 20 are turbines or ventilators which are designed optimally for a given gas speed, generally the maximum speed of the quenching installation. Thus, these conventional stirring elements are not optimized for lower speeds which are often used for materials requiring a soft quenching or a controlled cooling.

For the operation of the quenching installation to be optimal over a wide range of flow rates, the present invention provides using blade propellers of adjustable pitch as stirring elements 20. The pitch is adjusted to obtain, for a desired flow rate, the maximum efficiency of power transmission from the engines to the flow, and thus a power consumption reduced to what is strictly necessary.

Figure 2:
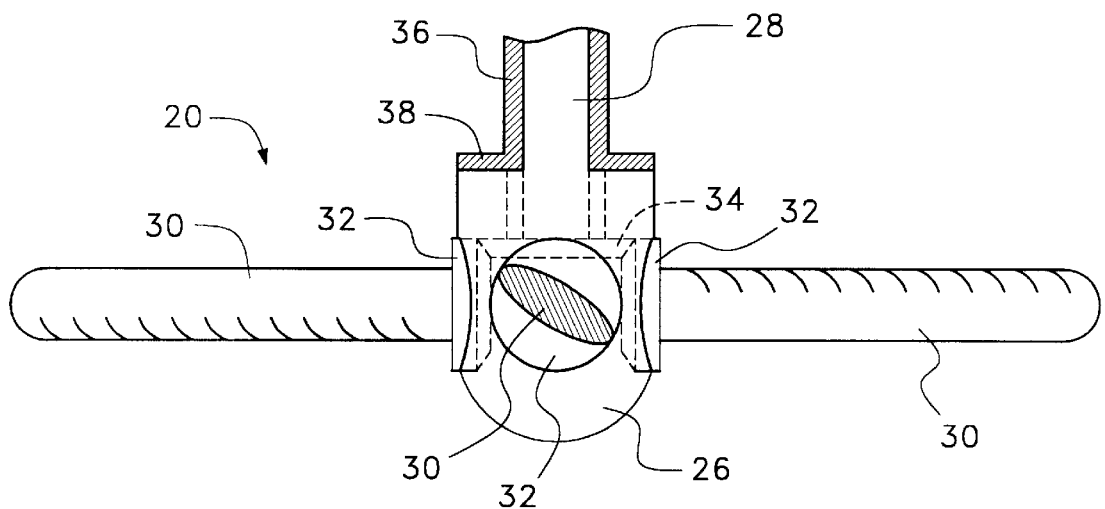
FIG. 2 schematically shows an embodiment of a stirring element according to the present invention.

FIG. 2 schematically shows an embodiment of an adjustable-pitch blade propeller 20. This blade propeller may be of the type used on planes. It comprises a hub 26 connected to the corresponding engine, not shown, by a shaft 28.

Blade propeller 20 includes several blades 30 which extend radially from hub 26. Each of blades 30 is attached to a base 32 rotatably mounted on hub 26 about a radial axis. The inclination of blades 30, and thus the blade propeller pitch, can thus be adjusted by rotating bases 32.

To adjust the inclination of all blades 30 at once, bases 32 are for example interconnected by a bevel gear pinion 34, the axis of which is shaft 28 of the blade propeller. With this configuration, the inclination of blades 30 can be adjusted by rotating bevel gear pinion 34 with respect to shaft 28. For this purpose, pinion 34 is attached, for example, to the end of a sleeve 36 surrounding shaft 28.

The inclination of blades 30 may be manually or automatically adjusted.

To perform a manual adjustment, a chart providing the inclination of the blades according to the nature and the pressure of the quenching gas is experimentally determined. To facilitate manual adjustment, sleeve 36 is, for example, provided with a disk 38 placed on hub 26, which is rotated with respect to the hub to obtain the desired inclination of blades 30, and which is then tightened about hub 26 by means of screws. Further, the edge of disk 38 may include a graduated sale in front of a mark on hub 26.

To perform an automatic adjustment of the inclination of blades 30, hub 36 is coupled to a servomotor which rotates sleeve 36 with respect to shaft 28. The inclination of blades 30 may then be controlled by several parameters determining the optimal blade inclination, especially to provide a minimum power to the engine at the desired gas flow rate.

Further, to obtain a maximum quenching speed and the corresponding optimal blade adjustment, the control system may be provided to progressively incline blades 30 from a zero angle until the maximum engine power is reached.

As is conventional for an airplane blade propeller, blades 30 may have a variable pitch, that is, they may have an inclination which decreases from hub 26 to the blade ends. This provides an optimal inclination at each point of the blade.

Figure 3:
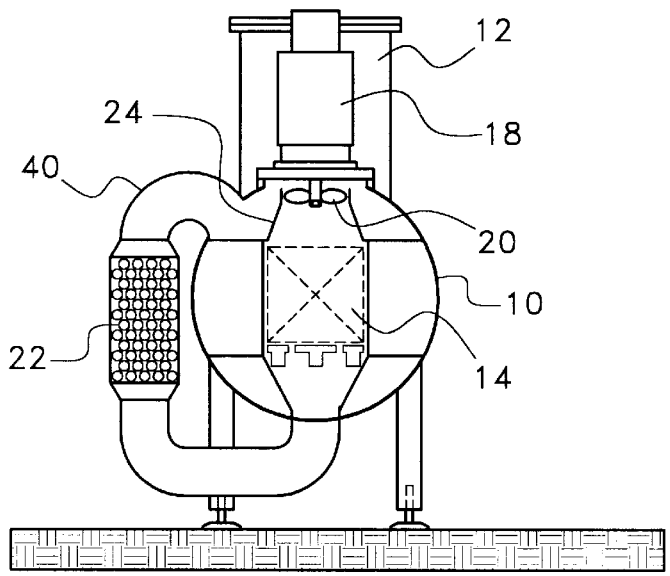
FIG. 3 shows a second embodiment of a quenching cell.

FIG. 3 shows a second embodiment of a gas-quenching cell which can be used according to the present invention. This cell includes elements similar to those of FIGS. 1A and 1B, designated by same references. The cell includes a duct 40 forming a loop outside the cell. Guiding plates 24 are arranged so that the gas flows through load 14, into duct 40, and through exchanger 22, here placed in duct 40.

The placing of exchanger 22 in duct 40 eases its access and solves sealing and maintenance problems. Further (not shown), blade propeller 20 may also be arranged in duct 40, preferably close to the ground, which eases the use of high power engines that may advantageously lie on the ground rather than risen to the upper cell portion.

Preferably, a gas-quenching cell according to the present invention is independent from a furnace in which the load is brought to the desired temperature. Indeed, when the quenching is performed in the furnace which has been used for the heating, as usual, the quenching gas must cool not only the load, but also all the heated up furnace elements. This represents a non-negligible amount of heat to be evacuated by the quenching gas and considerably decreases the installation efficiency. However, by performing the quenching in a cold cell separated from the furnace, the load is the only element to be cooled down.

In a quenching installation according to the present invention, the optimal gas appears to be nitrogen or a mixture containing at least 50% of nitrogen. This gas is inexpensive and inert. It may be used, in an installation according to the present invention, at a pressure between 1 and 50 bars. The use of high pressures raises no problem, even if engines of relatively low power are used. Indeed, the quenching gas flow rate will be maximum with respect to the engine power, due to the fact that the blade inclination will be adjusted to obtain the best efficiency of transmission of the engine power to the gas flow without exceeding the maximum power provided in the installation for the engine.

Figure 4:
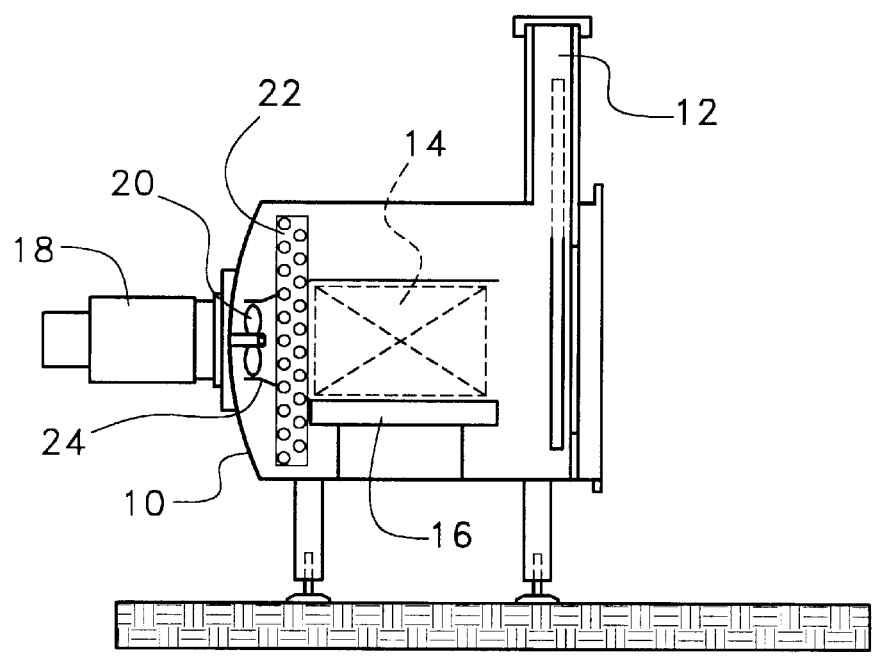
FIG. 4 shows a third embodiment of a quenching cell.

FIG. 4 shows a third embodiment of a quenching cell which can be used according to the present invention. In this embodiment, a single engine 18 is mounted in the cell axis, at its closed end. Exchanger 22 is in the form of a vertical disk arranged between load 14 and blade propeller 20, the axis of which is horizontal here. Guiding plates 24 start at exchanger 22 and surround load 14. With this configuration, a gas flow is obtained in a first direction through the central portion of exchanger 22 and load 14, and in the opposite direction in the peripheral portion of exchanger 22.

Figure 5:
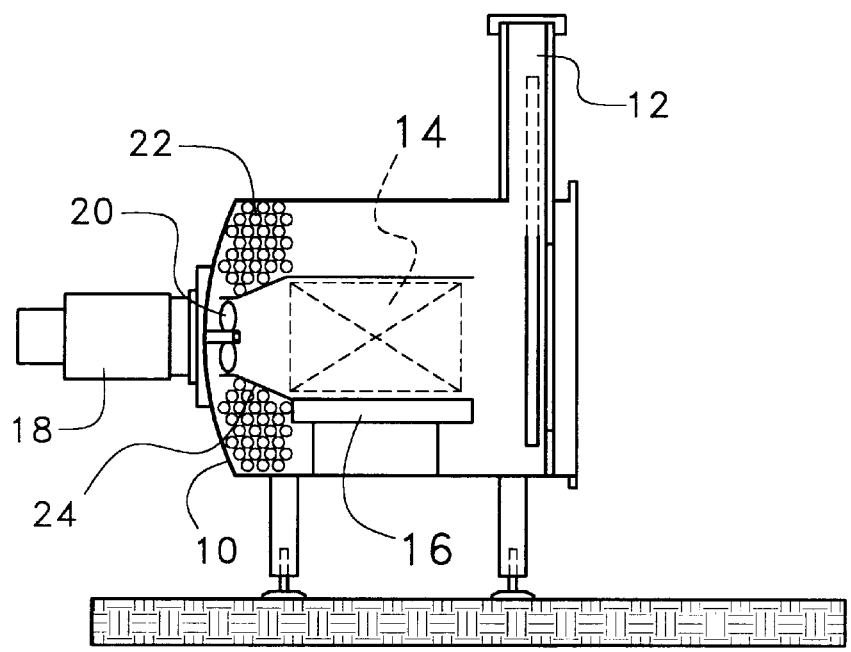
FIG. 5 shows a fourth embodiment of a quenching cell.

FIG. 5 illustrates a fourth embodiment of a gas-quenching cell which can be used according to the present invention. This embodiment is similar to that of FIG. 4, except that exchanger 22 is arranged as a crown around blade propeller 20. Guiding plates 24 start at the periphery of blade propeller 20 and surround load 14.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A cell for gas-quenching a load (14), including guiding plates (24) and a stirring element (20) driven by an engine (18) to cause a gas flow between the load and an exchanger (22), wherein the stirring element is an adjustable pitch blade propeller.

2. The quenching cell of claim 1, wherein the pitch of the blade propeller (20) is adjusted so that, at a desired gas mass flow, the engine operates with a maximum efficiency of power transmission to the flow.

3. The quenching cell of claim 2, separate from a furnace used to heat up the load before cooling.

4. The quenching cell of claim 3, wherein the gas is at least one of nitrogen or a mixture including at least 50% of nitrogen, at a pressure between 1 and 50 bars.

5. The quenching cell of claim 2, wherein the gas is at least one of nitrogen and a mixture including at least 50% of nitrogen, at a pressure between 1 and 50 bars.

6. The quenching cell of claim 1, wherein the cell is cylindrical or parallelepiped-shaped and the exchanger (22) is arranged axially on either side of the load (14), the axis of the blade propeller (20) being perpendicular to the plane of the exchanger.

7. The quenching cell of claim 6, separate from a furnace used to heat up the load before cooling.

8. The quenching cell of claim 7, wherein the gas is at least one of nitrogen and a mixture including at least 50% of nitrogen, at a pressure between 1 and 50 bars.

9. The quenching cell of claim 6, wherein the gas is at least one of nitrogen and a mixture including at least 50% of nitrogen, at a pressure between 1 and 50 bars.

10. The quenching cell of claim 1, separate from a furnace used to heat up the load before cooling.

11. The quenching cell of claim 10, wherein the gas is at least one of nitrogen and a mixture including at least 50% of nitrogen, at a pressure between 1 and 50 bars.

12. The quenching cell of claim 1, including a duct (40) forming a loop external to the cell, through which is forced the gas flow.

13. The quenching cell of claim 12, wherein the exchanger (22) is arranged in the duct (40).

14. The quenching cell of claim 13, wherein the gas is at least one of nitrogen and a mixture including at least 50% of nitrogen, at a pressure between 1 and 50 bars.

15. The quenching cell of claim 5, wherein the blade propeller (20) is arranged in the duct (40).

16. The quenching cell of claim 10, wherein the gas is at least one of nitrogen and a mixture including at least 50% of nitrogen, at a pressure between 1 and 50 bars.

17. The quenching cell of claim 1, wherein the exchanger (22) is in the form of a disk arranged so that it is run through by opposite gas flows at its periphery and at its center.

18. The quenching cell of claim 1, wherein the exchanger (22) is arranged as a crown around the blade propeller axis.

19. The quenching cell of claim 1, wherein the gas is at least one of nitrogen and a mixture including at least 50% of nitrogen, at a pressure between 1 and 50 bars.

20. The quenching cell of claim 1, including several stirring blade propellers.

* * * * *

UNITED STATES PATENT AND TRADEMARK OFFICE
CERTIFICATE OF CORRECTION

PATENT NO.    : 6,216,358 B1
DATED         : April 17, 2001
INVENTOR(S)   : Laurent Pelissier It is certified that error appears in the above-identified patent and that said Letters Patent is hereby corrected as shown below:

<u>Title page,</u>
Item [75], the inventor's last name is not spelled correctly. The correct spelling should be:

-- Inventor(s):   Laurent Pelissier --

Signed and Sealed this

Twenty-fifth Day of February, 2003

JAMES E. ROGAN
*Director of the United States Patent and Trademark Office*